(12) United States Patent
Raudsepp et al.

(10) Patent No.: US 8,247,737 B2
(45) Date of Patent: Aug. 21, 2012

(54) CONTACT DEVICE FOR WELDING APPARATUS

(75) Inventors: Hannes Raudsepp, Solna (SE); Bo Jansson, Älgarås (SE)

(73) Assignee: ESAB AB, Gothenburg (SE)

( * ) Notice: Subject to any disclaimer, the term of this patent is extended or adjusted under 35 U.S.C. 154(b) by 357 days.

(21) Appl. No.: 12/530,160

(22) PCT Filed: Mar. 4, 2008

(86) PCT No.: PCT/SE2008/050240
§ 371 (c)(1),
(2), (4) Date: Feb. 15, 2010

(87) PCT Pub. No.: WO2008/108728
PCT Pub. Date: Sep. 12, 2008

(65) Prior Publication Data
US 2010/0140242 A1      Jun. 10, 2010

(30) Foreign Application Priority Data
Mar. 6, 2007   (SE) ...................................... 0700548

(51) Int. Cl.
*B23K 9/00*         (2006.01)
(52) U.S. Cl. ................. 219/136; 219/137.61; 219/137.2; 219/138
(58) Field of Classification Search ................... 219/136, 219/137.61, 137.2, 138
See application file for complete search history.

(56) References Cited

U.S. PATENT DOCUMENTS

| 3,751,628 | A | 8/1973 | Scherl |
| 6,559,416 | B1 | 5/2003 | Steenis et al. |
| 7,262,386 | B2 * | 8/2007 | Matthews et al. ........ 219/137.61 |

FOREIGN PATENT DOCUMENTS

| DE | 2 146 406 | 3/1973 |
| DE | 23 63 523 A1 | 1/1975 |
| DE | 29 49 318 A1 | 6/1981 |
| EP | 0224669 A2 | 6/1987 |
| GB | 1 397 236 | 6/1975 |
| GB | 1 400 051 | 7/1975 |
| GB | 1 451 495 | 10/1976 |
| UA | 16 364 U | 8/2006 |

* cited by examiner

*Primary Examiner* — Tu-Tu Ho
(74) *Attorney, Agent, or Firm* — Alston & Bird LLP

(57) ABSTRACT

A contact fitting for a welding apparatus includes a housing, and first contact device, a second contact device, and a third contact device arranged between the first and second contact devices. The third contact device is movable relative to the first and second contact devices. The first contact device has an elongated form, is fixedly arranged in the housing, and extends from a first end, which is arranged between first and second ends of the housing, to a second end. The second contact device has an elongated form, is suspended spring-loaded to the housing, and extends from a first end, which is arranged between the first and second ends of the housing, to a second end.

25 Claims, 4 Drawing Sheets

Fig 5   a            b

CONTACT DEVICE FOR WELDING APPARATUS

TECHNICAL FIELD

The present invention relates to a contact fitting for a welding apparatus and to a welding apparatus equipped with such a contact fitting. More specifically, the present invention relates to a contact fitting and a welding apparatus for two welding wires. Especially the invention relates to contact fittings for use during powder welding.

DESCRIPTION OF THE PRIOR ART

The present invention relates to welding and primarily to a contact fitting for powder welding, which is often designated PW. During PW at least one welding wire is fed forward through a contact fitting to the welding point. It has proved to be advantageous to use two welding wires which are fed forward to the welding point to a common contact fitting. With this method more material is provided to the welding joint and increases the co-efficient of fullness in the joint. The coefficient of fullness is usually measured with the so-called deposition rate.

Powder welding is a well-known technique in connection with welding. In known contact fittings for powder welding, two wires are fed forward parallelly and the welding wires pass over a common first contact shoe against which they are pressed by a common second contact shoe. A problem with the described solution is that if there exists a certain difference in diameter between the welding wires, due to for example production tolerances or flattening in a truing device or a feeding mechanism, both contact shoes will not press evenly against the welding wires which affects the current transition to the welding wires negatively. The same phenomena may also arise by the curvature of the welding wire pressing the contact shoes outward or if the contact shoes are weared unevenly in the contact surfaces with the wires. Still another problem with the described solution is that the contact shoes must be assembled on place in the welding arrangement with both welding wires introduced into the contact fitting. The assembly is a difficult precision stage where it must be made certain that the resilience of the contact shoes becomes correct in order to guarantee a good current transition to the welding wire at the tip of the contact shoes.

In the British patent GB 1451495 a welding unit is presented in which two wires are output parallelly from a contact fitting. One of the wires is in contact with a fixed contact shoe and a movable intermediate contact shoe. The other wire is in contact with the movable intermediate contact shoe and a spring-loaded contact shoe. The spring-loaded contact shoe presses the other wire against the movable intermediate contact shoe which thereby in turn is pressed against the first wire and the first contact shoe. The movable intermediate contact shoe is movably suspended turnable around an axis. The spring-loaded contact shoe is arranged displacable essentially perpendicular to the wires, wherein a spring is arranged on the side of the contact shoe which is opposite to the other wire in order to exercise the spring force on the spring-loaded contact shoe.

A problem with a contact fitting according to said British patent is that the contact fitting is relatively wide in the plane which is defined by the wires. In many instances it is desirable to place more than one contact fitting next to each other in the plane which is defined by the wires, in which instance it is also desirable that all wires may be placed close to each other in a welding point. With the contact fitting according to the British patent it is however difficult to place the wires close to each other. Another problem with the contact fitting according to the British patent is that it is difficult to transmit sufficiently large currents to the second wire as this must be done either through the spring-loaded contact shoe or the movable intermediate contact shoe. A further problem with a contact fitting according to the British patent is that the spring-loaded contact shoe presses the wires at a relatively large distance from the end of the contact fitting. This results in that the welding wire may bend on the way from the spring-loaded contact shoe to the welding point.

SUMMARY OF THE INVENTION

An object of the present invention is to provide a contact fitting for a welding apparatus designed for two welding wires and a welding apparatus equipped with such a contact fitting, which contact fitting provides an even pressure on both welding wires independently of irregularities on the wires.

A further object of the present invention is to provide a contact fitting for a welding apparatus designed for at least two welding wires and a welding apparatus equipped with such a contact fitting, which contact fitting is narrow in the plane which is defined by the wires and/or narrow perpendicular to the plane which is defined by the wires.

Another object of the present invention is to provide a contact fitting for a welding apparatus designed for two welding wires and a welding apparatus equipped with such a contact fitting, which contact fitting provides an even pressure on both welding wires.

Another object of the present invention is to provide a contact fitting for a welding apparatus designed for two welding wires and a welding apparatus equipped with such a contact fitting, which contact fitting provides an electrical contact point for the welding wires on a stable position in relation to the end of the contact fitting.

A further object of the present invention is to provide a contact fitting for a welding apparatus designed for two welding wires and a welding apparatus equipped with such a contact fitting, which contact fitting provides an electrical contact point for the welding wires close to the end of the contact fitting.

At least one of these objects is provided with a contact fitting and a welding apparatus according to the appended independent claims.

Further advantages with the invention are achieved with the features in the dependent claims.

A contact fitting according to the invention, for feeding current to at least a first welding wire and a second welding wire and designed for a welding apparatus, comprises a length axis, a housing, with a first end and a second end. The housing is arranged to allow the welding wires to run parallelly to the length axis from the first end of the housing to the second end of the housing. The contact fitting further comprises a first contact device which is arranged to be in contact with only the first welding wire, a second contact device which is arranged to be in contact with only the second welding wire and a third contact device which is arranged between the first contact device and the second contact device, which is movable in relation to both the first contact device and the second contact device and arranged to be in contact with both the first welding wire and the second welding wire. The contact fitting is characterized in that the first contact device has an elongated form, is arranged fixed to the housing and extends from a first end, which is arranged between the first end of the housing and the second end of the housing, essentially parallelly to the length axis to a second end, and that the second contact device has an elongated form, is attached spring-loaded suspended in the housing and extends from a first end, which is arranged between the first end of the housing and the second end of the housing, essentially parallelly with the first contact device to a second end.

The first contact device may comprise a separate part which is removably attached to the housing or comprise an integrated part of the housing and thereby being permanently fixed to the housing.

The contact device is suspended in the housing in one of its ends and the contact devices are in principle freebearing outside the housing. This results in the contact devices only having to be dimensioned for the pressure forces which are to be applied to the welding wires. With a contact fitting according to the invention the contact devices may thus be made narrow in the area where the welding wires leave the contact fitting. This results in that several contact fittings may be placed close to each other in the welding area at the same time as an even pressure is applied on both welding wires independently of irregularities or bending of the welding wires. With a contact fitting according to the invention it is also possible to use welding wires of any of a plurality of different diameters.

The first contact device may comprise a first arm which is attached to the housing and a first contact shoe which is arranged on the arm in order to be in contact with the first welding wire. By the first contact device being divided into an arm and a contact shoe the properties for the arm may be optimized from a strength point of view while the contact shoe may be optimized from a current transmission view. Furthermore, it is the first contact shoe and not the first arm that is weared down during welding. The first contact shoe may then be exchanged when necessary while the first arm may be used during a longer period.

The first contact shoe may extend from a first point on the arm which is at a short distance from the housing to a second point at a larger distance from the housing. The first contact shoe only has to exist where the welding wires are in contact with it, which is the case only beyond the housing in the direction of the length axis.

The first contact shoe may extend to the second end of the first contact device, i.e. that the first contact shoe comprises the outermost point of the first contact device. It is advantageous if the first contact device is as narrow as possible in its second end, which is the case if its end is comprised of the contact shoe only.

The first arm may extend to the second end of the first contact device either together with the first contact shoe or by itself. The arm gives support to the first contact shoe which in some cases may be advantageous to give all the way to the second end of the first contact device.

The area of the cross-section of the first arm may decrease from the housing in the direction towards the second end of the first contact device. The first arm has the purpose of supporting the first contact shoe mechanically. This may be achieved also with a decreasing cross-section of the first arm which thereby may be made smaller in the second end of the contact device. This results in that several contact fittings may be placed closer to each other.

The area of the cross-section of the first arm may decrease inter alia by its dimension decreasing in the plane defined by the wires or perpendicularly to the plane which is defined by the wires.

The second contact device may comprise a second arm which is attached to the housing and a contact shoe which is arranged on the arm in order to be in contact with the second welding wire. By the second contact device being divided into an arm and a contact shoe the properties for the arm may be optimized from a strength point of view while the contact shoe may be optimized from a current transition point of view. Furthermore, it is the second contact shoe and not the second arm which is weared down during welding. The second contact shoe may then be exchanged when necessary while the second arm may be used during a longer period.

The second contact shoe extends from a first point on the arm which is at a distance from the housing to a second point at a larger distance from the housing. The second contact shoe then only has to exist where the welding wires are in contact with it, which is the case only beyond the housing in the direction of the length axis.

The second contact shoe may extend to the second end of the second contact device, i.e. that the second contact shoe comprises the outermost point of the second contact device. It is advantageous if the second contact device is as narrow as possible in its second end which is the case if its end is comprised of the contact shoe only.

The second arm may extend to the second end of the second contact device either together with the first contact shoe or by itself. The second arm gives support for the second contact shoe, which in some cases may be advantageous to give all the way to the second end of the second contact device.

The area of the cross-section of the second arm may decrease from the housing in the direction towards the second end of the second contact device. The second arm has the purpose of supporting the second contact shoe mechanically. This may be achieved even with a decreasing cross-section of the second arm which thereby may be made more narrow in the second end of the contact device. This allows several contact fittings to be placed closer to each other.

The area of the cross-section of the second arm may decrease inter alia by its dimension decreasing in the plane which is defined by the wires or perpendicular to the plane which is defined by the wires.

The third contact device may be arranged turnable and movable in relation to the first contact device and the second contact device. Such an arrangement of the third contact device results in that a good contact may be maintained between the third contact device and the welding wires.

In order to provide the above described turnability and movability the third contact device may comprise guidance means which are arranged fixed in the third contact device, which extends through the third contact device and which protrudes on both sides of the third contact device, and wherein there are arranged holes in the first contact device and the second contact device for reception of the guidance means.

The guidance means on the third contact device may be comprised of at least one pin which is arranged fixed on the third contact device at a distance from the housing, wherein there is arranged holes in the first contact device and the second contact device for reception of the pins. By arranging the third contact device suspended in this way it may follow the potential bending and varying thickness of the welding wires. Thereby, a good contact between the third contact device and the welding wires is guaranteed.

The guidance means may be comprised of at least two pins. By the guidance means comprising two pins a better stability of the third contact device is provided in case the pins are circular.

In case the guidance means comprises two pins, the pins may be arranged fixed on the third contact device at different distances from the housing. Alternatively they may be arranged at the same distance from the housing.

Alternatively the guidance means may be comprised of a plane plate. Such a guidance means may be easier to provide than two pins at the same time as it may provide stability for the third contact device.

In the case that the contact devices are divided into arms and contact shoes, the holes in the first contact device and the second contact device may be arranged in the first contact shoe and the second contact shoe between the housing and the first contact shoe, and between the housing and the second contact shoe, respectively. This provides for a stable attachment of the third contact device.

The housing may comprise a heel at a distance from its second end, which heel the second contact device is arranged to be in contact with at its first end and around which the second contact device is turnable in the plane which is defined by the length axis and the first contact device. With such a heel a good current transmission between the housing and the second contact device is guaranteed at the same time as the third contact device becomes turnable in relation to the housing.

The second contact device may comprise a through hole through which a screw with a screwhead is arranged, which screw is screwed into the housing, and wherein a spring means is arranged between the screwhead and the second contact device in order to thereby springload the second contact device. This is an uncomplicated way of providing spring-loading of the second contact device.

The spring means may comprise at least one cup spring. Cup springs are robust and take little space which makes them advantageous for this application. Examples on alternative implementations of the spring means comprises at least a helical spring, a plate spring or a rubber spring.

It is also possible to arrange the arms so that they by themselves are somewhat resilient. This may also be achieved by suitable choices of dimensions and materials in the arms.

According to a second aspect of the present invention a welding apparatus is provided comprising a contact fitting according to any of the preceding claims. Such a welding apparatus provides the same advantages as a contact fitting according to the invention.

In the following, preferred embodiments of the invention will be described with reference to the appended drawings.

SHORT DESCRIPTION OF THE DRAWINGS

FIG. 5 shows schematically the end of a contact fitting according to an alternative embodiment of the present invention.

DESCRIPTION OF PREFERRED EMBODIMENTS OF THE INVENTION

Figure 1:
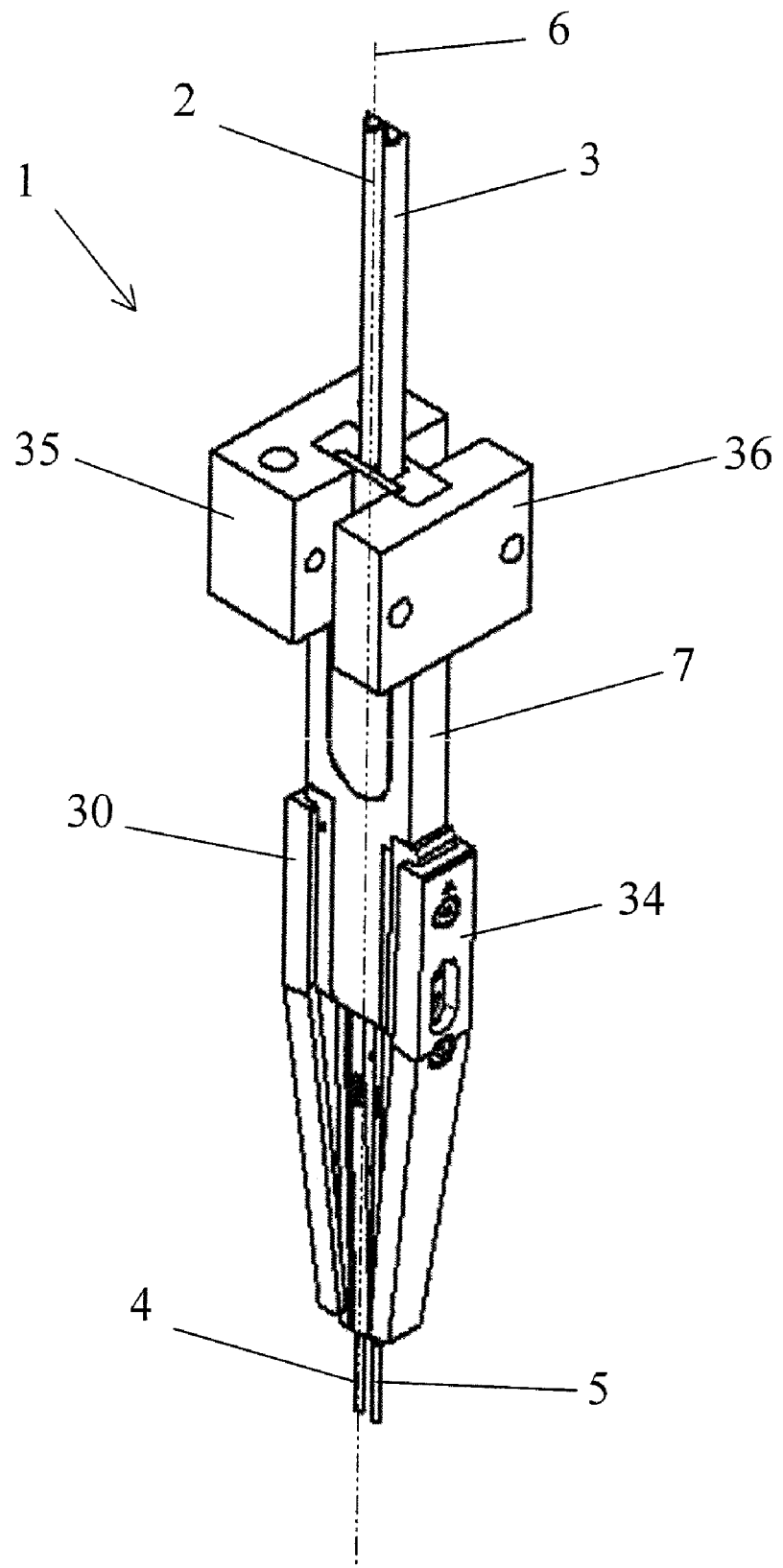
FIG. 1 shows a contact fitting according to an embodiment of the present invention.

In the following description of preferred embodiments of the invention, similar parts in different figures will be denoted by the same reference numeral.

Figure 2:
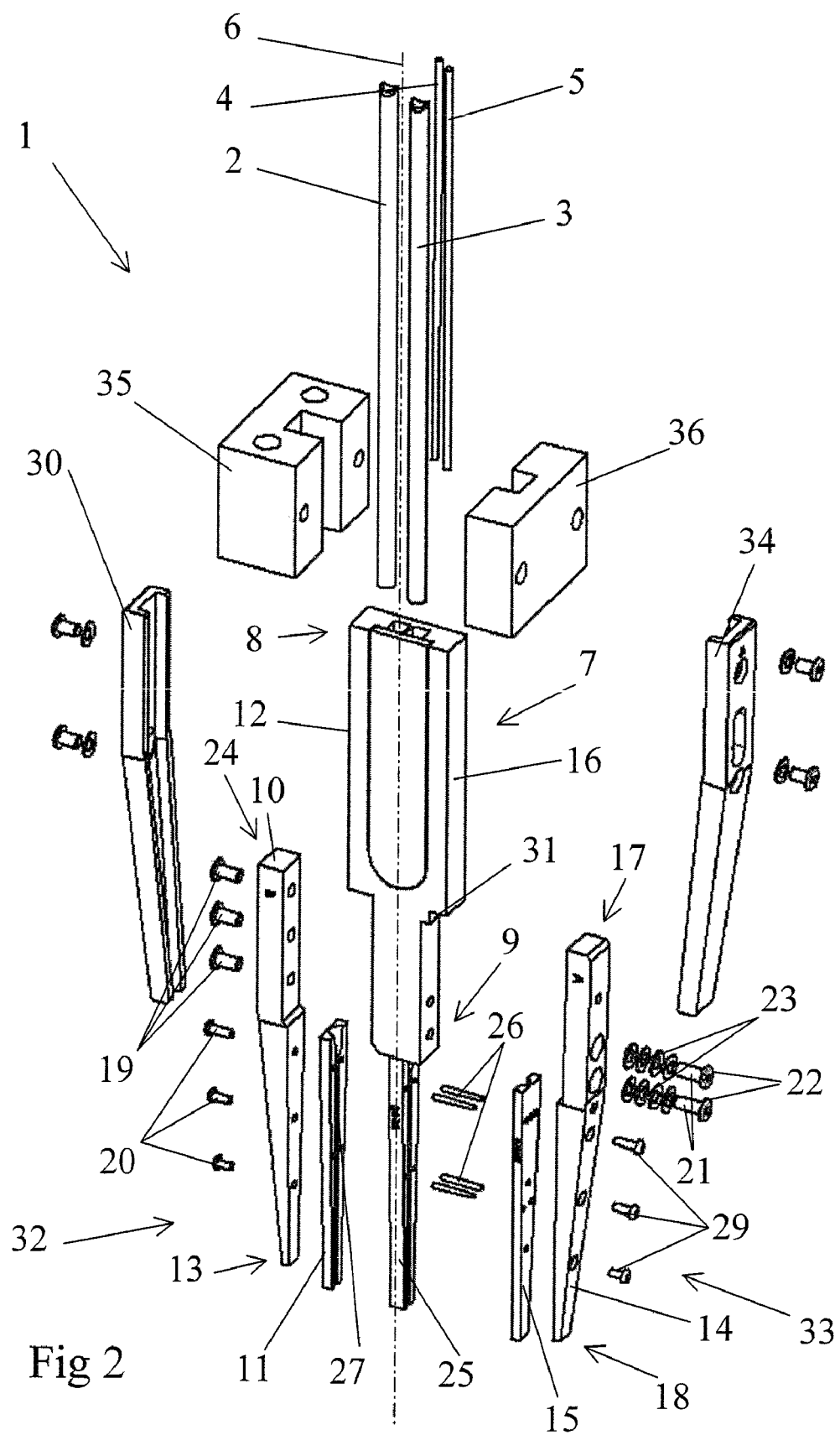
FIG. 2 is an exploded view of the contact fitting in FIG. 1.

FIG. 1 shows a contact fitting 1 according to an embodiment of the invention while FIG. 2 is an exploded view of the contact fitting in FIG. 1. As is shown in FIG. 1, a first guidance tube 2 and a second guidance tube 3 are connected to the contact fitting 1 and arranged to lead a first welding wire 4 and a second welding wire 5 to the contact fitting 1.

The contact fitting 1 comprises a length axis 6, a housing 7, with a first end 8 and a second end 9, through which housing 7 the welding wires 4, 5, are arranged to be output parallelly with the length axis from the first end 8 of the housing 7 to the second end 9 of the housing 7. The contact fitting 1 comprises also a first contact device 32, which comprises a first arm 10 and a first contact shoe 11. The first arm 10 has an elongated form and is arranged fixed in the housing 7 on a first side 12 of the housing 7 and extends from a first end 24, which is arranged between the first end 8 of the housing 7 and the second end 9 of the housing, essentially parallelly to the length axis to a second end 13 which is arranged at a distance from the housing 7. The first contact shoe 11 is arranged on the side of the first arm which is directed away from the first side 12 of the housing 7, in order to be in contact with the first welding wire 4, and extends essentially away from the housing 7 to the end 13 of the first contact device. The first arm 10 is attached to the housing 7 by means of arm screws 19 and the first contact shoe 11 is attached to the first arm 10 by means of a first set of shoe screws 20.

The contact fitting 1 further comprises a second contact device 33, which comprises a second arm 14 and a second contact shoe 15. The second arm 14 has an elongated form and is suspended spring-loaded in the housing 7 on a second side 16 of the housing 7 and extends from a first end 17, which is arranged between the first end 8 of the housing 7 and the second end 9 of the housing, essentially parallelly to the length axis to a second end 18 which is arranged at a distance from the housing 7. The second contact shoe 15 is arranged on the side of the second arm which is directed towards the first arm, in order to be in contact with the second welding wire 5 and extends essentially from the housing 7 to the second end 18 of the second contact device. The second contact shoe 15 is attached to the second arm 14 by means of a second set of shoe screws 29. On the second side 16 of the housing 7, at a distance from the second end 9 of the housing, there is arranged a heel 31 against which the first end 17 of the second arm 14 rests. The second arm 14 comprises through-going holes through which spring screws 21 with screw heads 22 are arranged and screwed into the housing 7. Between each one of the screw heads 22 and the second arm 14 there is arranged spring means 23 in the form of cup springs which exerts a force on the second arm 14 and the second contact shoe 15 in the direction towards the first arm 10 and the first contact shoe 11.

Both the first arm 10 and the second arm 14 has a cross-section whose area decreases from the housing 7 in the direction towards the second ends 13, 18 of the arms 10, 14. Due to the decreasing area of the cross-section, the arms 10, 14 will have a small cross-section at their second ends 13, 18 without risking the strength of the arms 10, 14. The contact surfaces between each one of the arms 10, 14 and the corresponding contact shoe 11, 15, are essentially plane.

Between the first contact shoe 11 and the second contact shoe 15 there is arranged a third contact device 25 in the form of a third contact shoe. A guidance means in the form of guidance pins 26 is arranged fixed in the third contact device 25 and runs through and protrudes on both sides of the third contact device 25. In the first contact shoe 11 and in the second contact shoe 15, there is arranged corresponding holes 27 in which the guidance pins 26 are arranged. Current transmission to the third contact device 25 may either occur directly from the housing 7 to the third contact device 25, via the first contact shoe 11, via the second contact shoe 15, and/or via the guidance pins 26.

On the first side 12 of the housing 7 there is arranged a first isolation sleeve 30 in order to prevent unwanted discharges via the first side 12 of the contact fitting 1. In the corresponding way there is arranged a second isolation sleeve 34 on the second side 16 of the housing 7 in order to prevent unwanted discharges via the second side 16 of the contact fitting 1. A first clamp 35 and a second clamp 36 are arranged in the first end 8 of the housing, in order to provide means for fastening of the contact fitting 1 in a welding apparatus 28 (FIG. 3).

During operation a first welding wire 4 and a second welding wire 5 will be fed through the first guidance tube 2 and the second guidance tube 3 to the contact shoes 11, 15 so that the first welding wire 4 is fed forward between the first contact shoe 11 and the third contact shoe 25, and so that the second welding wire 5 is fed forward between the second contact shoe 15 and the third contact shoe 25. The second contact shoe 15 will press on the second welding wire 5 which in turn presses on the third contact shoe 25 which in turn presses on the first welding wire 4. The contact shoes 11, 15, 25 will thus be pressed against the welding wires 4,5, independently of the diameter and curvature of the wires.

Figure 3:
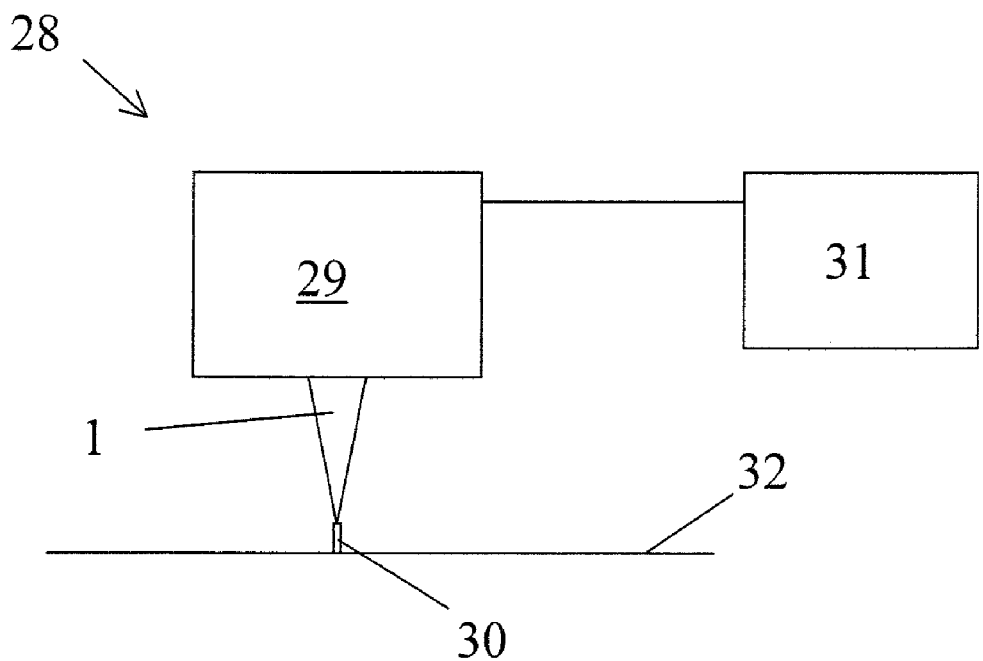
FIG. 3 shows a welding apparatus which comprises a contact fitting according to FIGS. 1 and 2.

In FIG. 3 a welding apparatus 28 for powder welding is shown schematically, which welding apparatus 28 comprises a contact fitting 1 according to the invention. The welding apparatus comprises a feeding device, which is arranged for feeding of a welding wire 30 to the contact fitting 1 and which is connected to a voltage source for applying a voltage between the contact fitting 1 and a welding surface 32.

Figure 4:
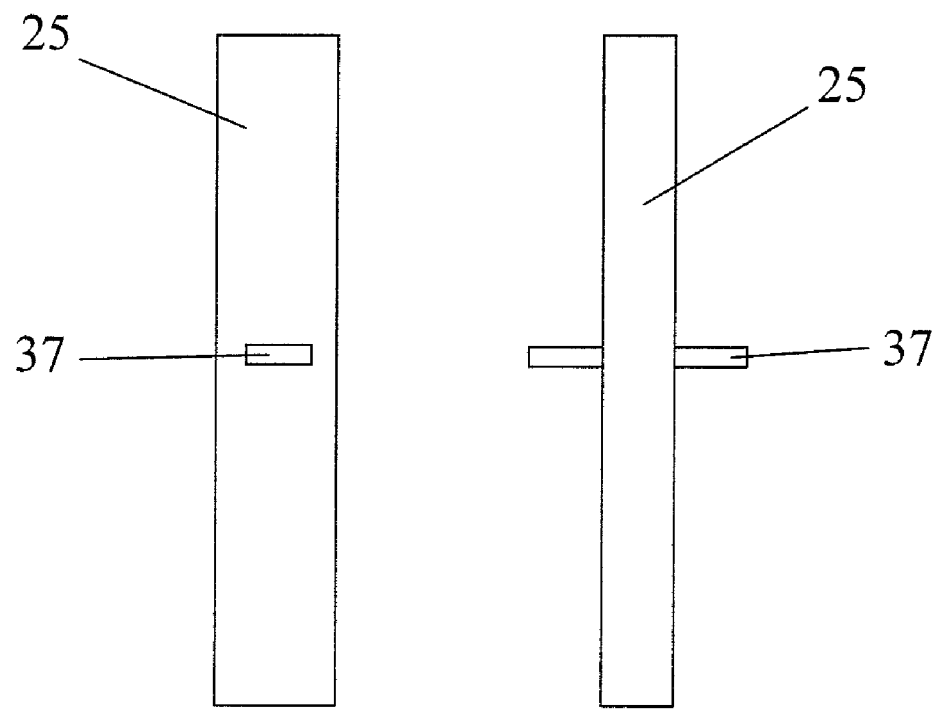
FIG. 4 shows schematically a third contact device with a guidance means in the form of a plane plate according to an alternative embodiment of the invention.

FIG. 4a shows schematically a third contact device 25 with a guidance means in the form of a plane plate 37 according to an alternative embodiment of the invention. In FIG. 4b the third contact device 25 is shown with the plane plate 37 in a view which is perpendicular to the first view.

FIG. 5a shows schematically the end of a contact fitting 1 according to an alternative embodiment of the present invention. FIG. 5b shows the same contact apparatus in a view from below perpendicular to the view in FIG. 5a. A first contact device 32 has, viewed in the view in FIG. 5a the form an L. In the view of FIG. 5b, the bridge 38 is shown which separates an opening 39, in which opening 39 the first welding wire 4 is arranged to run, as well as a groove 40, in which groove 40 the second welding wire 5 is arranged to run. The third contact device 25 rests on the bridge 38 which prevents the third contact device 25 from falling down. Thus, the third contact device 25 does not need to be provided with any guidance means. A second contact device 33 is arranged to run in the groove 40. One of the first contact device 32 and the second contact device 33 may be arranged spring-loaded. The function of the contact fitting in FIG. 5 is similar to what has been described above.

Figure 6:
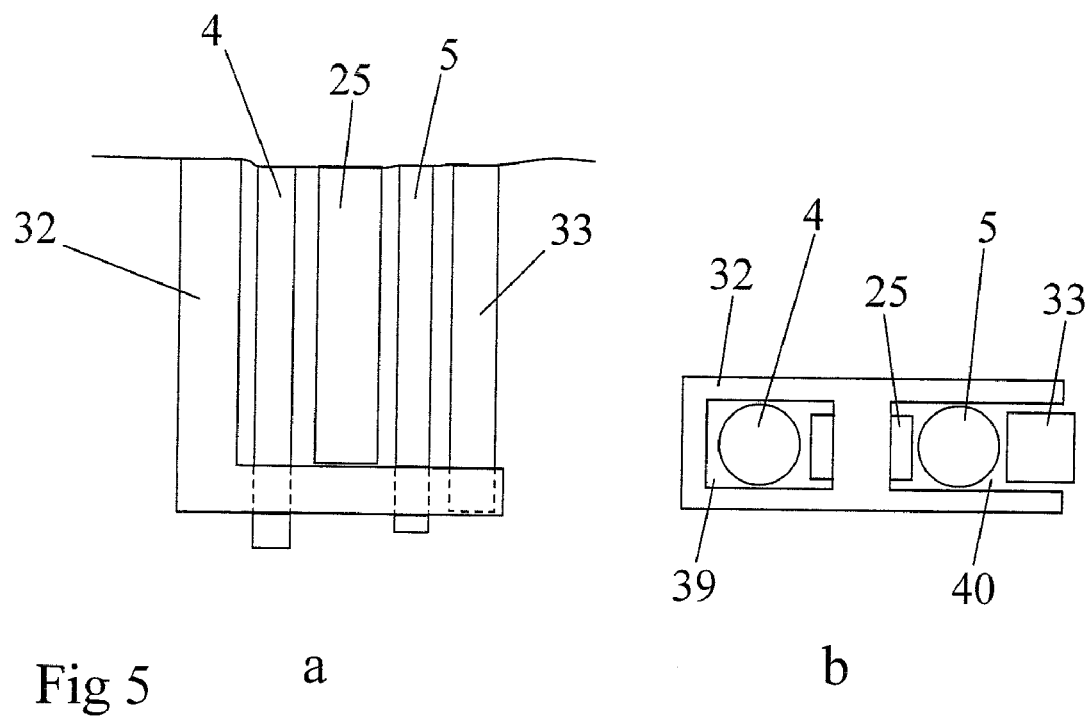
FIG. 6 shows schematically the end of a contact fitting according to an alternative embodiment of the present invention.

FIG. 6 shows schematically the end of a contact fitting according to an alternative embodiment of the present invention. Only the differences between the contact fitting in FIG. 6 and the contact fitting in FIG. 1 and FIG. 2 will be described. The third contact device 25 comprises a guidance means in the form of a guidance pin 42 which is arranged to run in a bent groove 43 in the housing 7 turnable around an axis of rotation 41.

Figure 7:
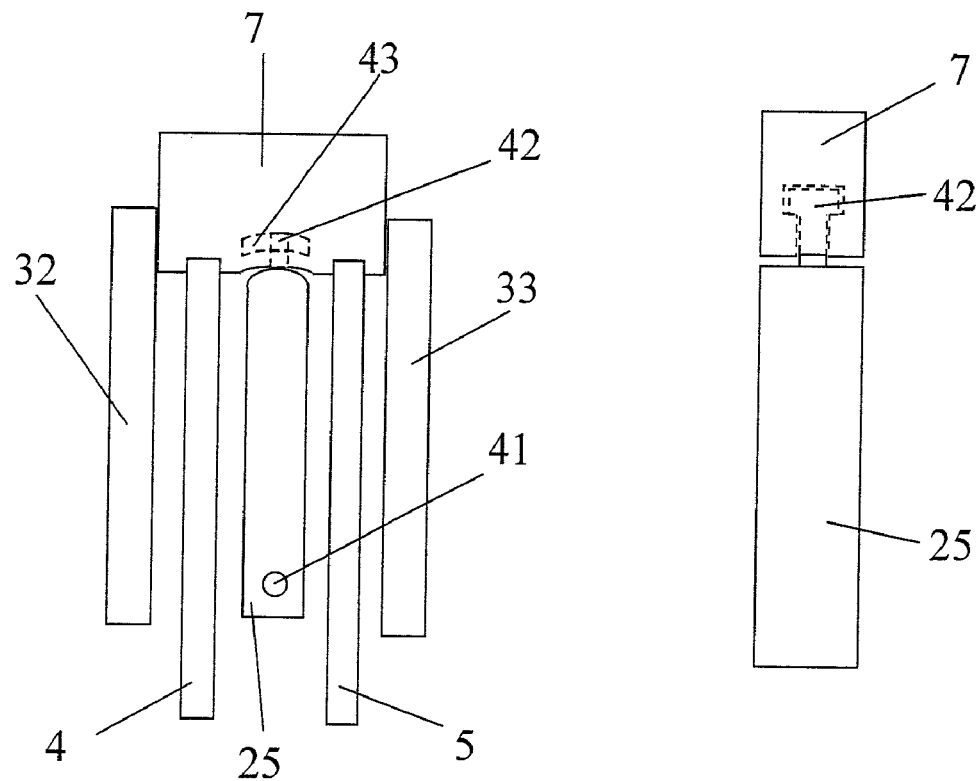
FIG. 7 shows schematically a part of the contact fitting in FIG. 6 in a view perpendicular to the view in FIG. 6.

FIG. 7 shows schematically a part of the contact fitting in FIG. 6 in a view perpendicular to the view in FIG. 6, in which view it is shown that the guidance pin 42 is T-formed.

The described embodiments may be varied in many ways without departing from the spirit and scope of the present invention which is limited only by the appended claims.

It is of course possible to arrange the third contact shoe movable in another way than has been described above. For example, the third contact shoe may be turnable around an attachment point in the housing 1.

It is possible to let both the first contact shoe 11 and the second contact shoe 15 be spring-loaded so that they both press against the common third contact shoe 25.

The contact fitting according to the invention may be used also to other forms of welding than powder welding (PW).

The above described T-formed groove for the third contact shoe may alternatively have another shape which prevents the guidance pin from leaving the groove. In light of the above description it would be easy for a person skilled in the art to design the guidance pin differently.

The invention claimed is:

1. Contact fitting for feeding current to at least a first welding wire and a second welding wire and arranged for a welding apparatus, which contact fitting comprises a length axis, a housing, with a first end and a second end, which is arranged to allow the welding wires to run parallelly with the length axis from the first end of the housing to the second end of the housing, a first contact device which is arranged to be in contact with only the first welding wire, a second contact device which is arranged to be in contact with only the second welding wire and a third contact device which is arranged between the first contact device and the second contact device, which is movable in relation to both the first contact device and the second contact device and arranged to be in contact with both the first welding wire and the second welding wire, characterized in that the first contact device has an elongated form, is arranged fixed to the housing and extends from a first end, which is arranged between the first end of the housing and the second end of the housing, essentially parallelly with the length axis to a second end, and the second contact device has an elongated form, is suspended spring-loaded in the housing and extends from a first end, which is arranged between the first end of the housing and the second end of the housing, essentially parallelly to the first contact device to a second end.

2. Contact fitting according to claim 1, wherein the first contact device comprises a first arm which is attached to the housing and a first contact shoe which is arranged on the first arm to be in contact with the first welding wire.

3. Contact fitting according to claim 2, wherein the first contact shoe extends from a first point on the arm which is at a short distance from the housing to a second point at a larger distance from the housing.

4. Contact fitting according to claim 3, wherein the first contact shoe extends to the second end of the first contact device.

5. Contact fitting according to claim 2, wherein the first arm extends to the second end of the first contact device.

6. Contact fitting according to claim 2, wherein the area of the cross-section of the first arm decreases from the housing in a direction towards the second end of the first contact device.

7. Contact fitting according to claim 6, wherein the area of the cross-section of the first arm decreases by its dimension perpendicular to the plane, which is defined by the wires, decreases from the housing in a direction towards the second end of the first contact device.

8. Contact fitting according to claim 6, wherein the area of the cross-section of the first arm decreases by its dimension in the plane, which is defined by the wires, decreases from the housing in a direction towards the second end of the first contact device.

9. Contact fitting according to claim 1, wherein the second contact device comprises a second arm which is attached to the housing and a second contact shoe which is arranged on the second arm to be in contact with the second welding wire.

10. Contact fitting according to claim 9, wherein the second contact shoe extends from a first point of the second arm which is at a distance from the housing to a second point at a larger distance from the housing.

11. Contact fitting according to claim 10, wherein the second contact shoe extends to the second end of the second contact device.

12. Contact fitting according to claim 9, wherein the second arm extends to the second end of the second contact device.

13. Contact fitting according to claim 9, wherein the area of the cross-section of the second arm decreases from the housing in a direction towards the second end of the second contact device.

14. Contact fitting according to claim 9, wherein the area of the cross-section of the second arm decreases by its dimension perpendicular to the plane which is defined by the wires decreases from the housing in a direction towards the second end of the second contact device.

15. Contact fitting according to claim 9, wherein the area of the cross-section of the second arm decreases by its dimension in the plane, which is defined by the wires, decreases from the house in a direction towards the second end of the second contact device.

16. Contact fitting according to claim 1, wherein the third contact device is arranged turnable and movable in relation to the first contact device and the second contact device.

17. Contact fitting according to claim 16, wherein the third contact device comprises guidance means which are arranged fixed in the third contact device, which extends through the third contact device, and which protrudes on both sides of the third contact device, and wherein there is arranged holes in the first contact device and the second contact device for reception of the guidance means.

18. Contact fitting according to claim 17, wherein the guidance means is comprised of at least one pin which is arranged fixed on the third contact device at a distance from the housing, and wherein there is arranged holes in the first contact device and the second contact device for reception of said pins.

19. Contact fitting according to claim 18, wherein the guidance means is comprised of at least two pins.

20. Contact fitting according to claim 19, wherein the pins are arranged fixed on the third contact device at different distances from the housing.

21. Contact fitting according to claim 17, wherein the guidance means is comprised by a plane plate.

22. Contact fitting according to claim 1, wherein the housing comprises a heel at a distance from its second end, which heel the second device is arranged to be in contact with at its first end and around which the second contact device is turnable in the plane which is defined by the length axis and the first contact device.

23. Contact fitting according to claim 22, wherein the second contact device comprises a through-going hole through which a screw with a screwhead is arranged, which screw is screwed into the housing, and wherein a spring means is arranged between the screwhead and the second contact device in order to thereby spring-load the second contact device.

24. Contact fitting according to claim 23, wherein the spring means comprises at least one from the group comprising, a cup spring, a helical spring, a plate spring and a rubber spring.

25. Welding apparatus comprising a contact fitting according to claim 1.

* * * * *

UNITED STATES PATENT AND TRADEMARK OFFICE
CERTIFICATE OF CORRECTION

| | | |
|---|---|---|
| PATENT NO. | : 8,247,737 B2 | Page 1 of 1 |
| APPLICATION NO. | : 12/530160 | |
| DATED | : August 21, 2012 | |
| INVENTOR(S) | : Raudsepp et al. | |

It is certified that error appears in the above-identified patent and that said Letters Patent is hereby corrected as shown below:

<u>Title page, Item (54) and Column 1, lines 1 and 2,</u>
In the title, "CONTACT DEVICE FOR WELDING APPARATUS" should read
--CONTACT FITTING FOR WELDING APPARATUS--.

Signed and Sealed this
First Day of January, 2013

David J. Kappos
*Director of the United States Patent and Trademark Office*